(12) United States Patent
Majima

(10) Patent No.: US 8,756,984 B2
(45) Date of Patent: Jun. 24, 2014

(54) ABNORMALITY DIAGNOSIS APPARATUS FOR ENGINE CONTROL SYSTEM

(71) Applicant: Denso Corporation, Kariya (JP)

(72) Inventor: Yusuke Majima, Kariya (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 13/726,888

(22) Filed: Dec. 26, 2012

(65) Prior Publication Data

US 2013/0160536 A1    Jun. 27, 2013

(30) Foreign Application Priority Data

Dec. 26, 2011  (JP) .................................. 2011-282812

(51) Int. Cl.
*G01M 15/11*  (2006.01)
(52) U.S. Cl.
USPC ........................................................ 73/114.11
(58) Field of Classification Search
USPC ........................................................ 73/114.11
See application file for complete search history.

(56) References Cited

U.S. PATENT DOCUMENTS

| 7,317,983 B2 * | 1/2008 | Ishizuka et al. ............... 701/103 |
| 7,706,962 B2 * | 4/2010 | Fushiki et al. ................ 701/114 |
| 7,913,668 B2 * | 3/2011 | Lewis et al. ................... 123/481 |
| 2006/0293828 A1 | 12/2006 | Ishizuka et al. |
| 2009/0240417 A1 | 9/2009 | Fushiki et al. |
| 2011/0253106 A1 * | 10/2011 | Bartsch et al. ................ 123/456 |

FOREIGN PATENT DOCUMENTS

JP    2013-087724    5/2013

OTHER PUBLICATIONS

Ponti et al., "PowerTrain Torsional Model Development for On-Board Indicated Torque Estimation", *4 4 6 SAE Int. J. Passeng. Cars—Electron. Electr. Syst.*, vol. 1, Issue 1, 2008, pp. 446-449.

* cited by examiner

*Primary Examiner* — Freddie Kirkland, III
(74) *Attorney, Agent, or Firm* — Nixon & Vanderhye PC

(57) ABSTRACT

In a condition where an engine is running, a fuel injector injects no fuel, and a fuel pump discharges no fuel so that a fuel pressure in a common-rail is kept constant, an ECU computes an actual torque based on a current engine speed and determines whether the actual torque is increased or decreased relative to a predetermined reference torque. Moreover, in the same condition as above, a fuel pressure in the common-rail is detected. Based on variations of the actual torque and the fuel pressure in the common-rail, the ECU determines whether an abnormality occurs and identifies a type of the abnormality.

7 Claims, 5 Drawing Sheets

ABNORMALITY DIAGNOSIS APPARATUS FOR ENGINE CONTROL SYSTEM

CROSS-REFERENCE TO RELATED APPLICATION

This application is based on Japanese Patent Application No. 2011-282812 filed on Dec. 26, 2011, the disclosure of which is incorporated herein by reference.

TECHNICAL FIELD

The present invention relates to an abnormality diagnosis apparatus for an internal combustion engine control system.

BACKGROUND

JP-2007-32540A describes that an instant rotating speed (instant NE) of an internal combustion engine is measured based on a crank angle signal transmitted from a crank angle sensor and an actual torque of the engine is estimated based on the measured instant NE. Moreover, based on the estimated actual torque of the engine, various types of abnormalities can be detected.

For example, when bio-fuel is supplied to a diesel engine and unburned bio-fuel flows into a crankcase, the engine oil is diluted by the unburned bio-fuel, which may cause a situation where the engine oil flows into a combustion chamber of the engine. In this situation, the engine oil is burned in the combustion chamber, so that the actual torque of the engine is increased more than a torque originally assumed. Thus, it can be determined whether a malfunction occurs in the engine control system based on an increase in the actual torque. Also, when there is a malfunction in which a fuel injector unintentionally injects fuel, the actual torque of the engine is increased more than a torque originally assumed. Thus, it can be determined whether a malfunction occurs in the engine control system based on the increase in the actual torque.

Although it can be determined whether a malfunction occurs in the engine control system based on the actual torque, it is impossible to determine what type of malfunction occurs in the engine control system. That is, in both malfunction cases where the engine oil flows into a combustion chamber of the engine and where a fuel injector has a malfunction, the actual torque is increased. Although it can be determined that a malfunction occurs, it is impossible to determine which one of the malfunction cases occurs.

SUMMARY

It is an object of the present disclosure to provide an abnormality diagnosis apparatus for an internal combustion engine control system, which is capable of identifying type of abnormality in the internal combustion engine control system.

According to the present disclosure, an abnormality diagnosis apparatus has a torque determining portion. The torque determining portion computes an actual torque based on an instant speed of an internal combustion engine under a specified condition where the internal combustion engine is running, a fuel injector injects no fuel and a fuel pump discharges no fuel so that the fuel pressure in the accumulator is kept constant. The torque determining portion further determines whether the actual torque is increased or decreased by a specified amount or more relative to a predetermined reference torque.

The abnormality diagnosis apparatus further includes a pressure variation detecting portion detecting a variation in fuel pressure in the accumulator under the specified condition. Furthermore, the abnormality diagnosis apparatus includes an abnormality determining portion determining whether an abnormality occurs and identifying a type of the abnormality based on a determining result of the torque determining portion and the variation in fuel pressure in the accumulator detected by the pressure variation detecting portion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
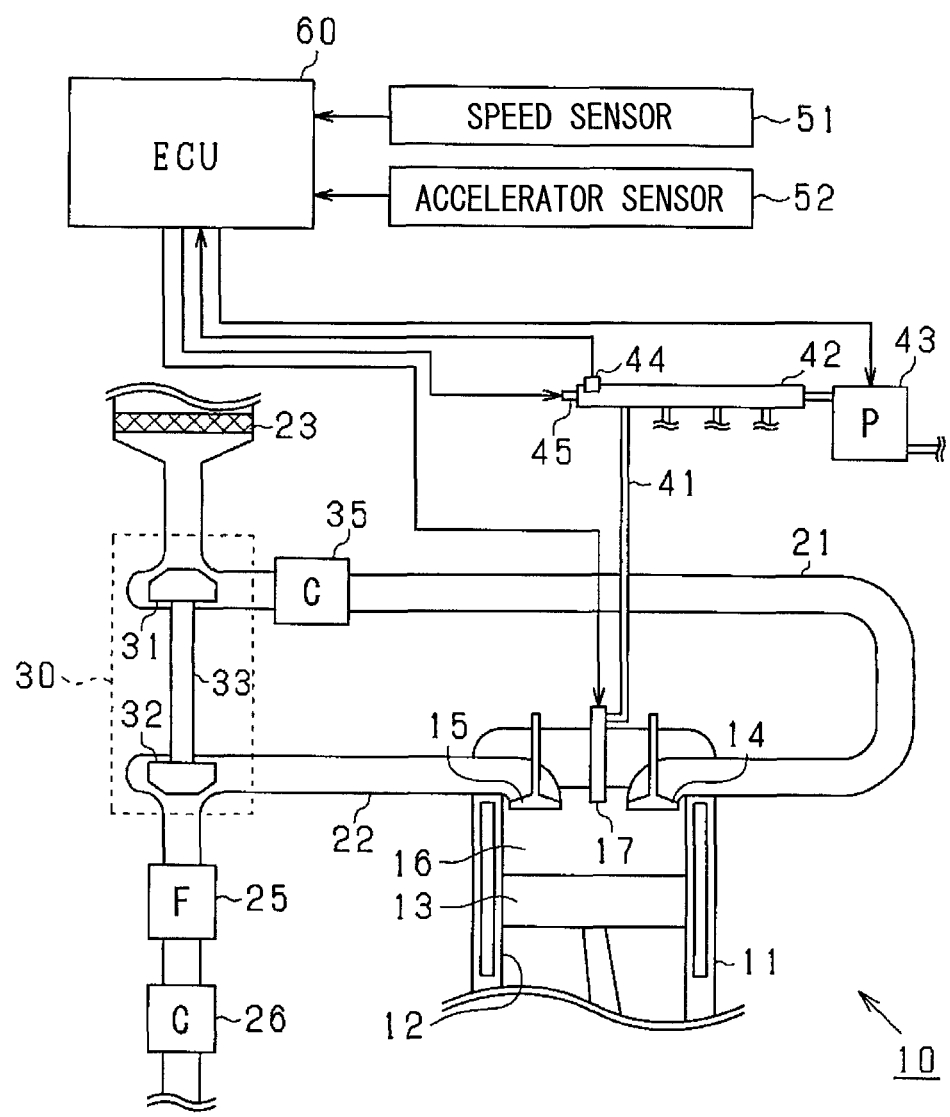
FIG. 1 is a schematic view showing a diesel engine control system.

Hereafter, an embodiment of the present disclosure is described. In the present embodiment, an abnormality diagnosis apparatus is applied to a control system provided with a common-rail fuel injection apparatus for a multi-cylinder diesel engine for a vehicle. Its detailed configuration will be described below. FIG. 1 is a schematic chart showing the control system.

A four-cylinder diesel engine 10 has a cylinder block 11 forming a cylinder 12 in which a piston 13 reciprocates. A reciprocative movement of the piston 13 rotates a crankshaft (not shown). An intake valve 14 and an exhaust valve 15 are respectively provided to an intake port and an exhaust port. A fresh air is introduced into a combustion chamber 16 through the intake valve 14 and an exhaust gas is discharged from the combustion chamber 16 through the exhaust valve 15. Moreover, the engine 10 is provided with a fuel injector 17 which injects fuel into the combustion chamber 16.

An intake pipe 21 is connected to the intake port and an exhaust pipe 22 is connected to the exhaust port. An air cleaner 23 is arranged most upstream of the intake pipe 21. A diesel particulate filter (DPF) 25 for capturing particulate matters (PM) in the exhaust gas and a NOx occlusion reduction catalyst (NOx catalyst) 26 for purifying NOx are arranged in the exhaust pipe 22. An EGR apparatus (not shown) for recirculating a part of exhaust gas is provided between the intake pipe 21 and the exhaust pipe 22.

A turbocharger 30 is provided between the intake pipe 21 and the exhaust pipe 22. The turbocharger 30 has a compressor impeller 31 and a turbine wheel 32 which are connected with each other through a shaft 33. An intercooler 35 for cooling compressed air is arranged downstream of the compressor impeller 31 in the intake pipe 21.

A common-rail 42 is fluidly connected to the fuel injector 17 through a high-pressure fuel pipe 41. The common-rail 42 is connected to a fuel pump 43 which supplies high-pressure fuel thereto. The fuel pump 43 is driven by the engine 10. The fuel pump 43 is provided with a suction control valve (SCV) which adjusts a discharge quantity thereof.

The common-rail 42 is provided with a pressure sensor 44 which detects an actual fuel pressure in the common-rail 42. Also, the common rail 42 is provided with a pressure-reducing valve 45 for reducing the fuel pressure in the common rail 42. The pressure-reducing valve 45 is a normally-closed solenoid valve which is energized when the fuel pressure in the common-rail 42 exceeds a target value. When the pressure-reducing valve 45 is opened, the fuel pressure in the common-rail 42 is released.

Moreover, the control system is provided with a detecting portion which detects various driving conditions of the vehicle and the engine 10. Specifically, the detecting portion includes a rotation speed sensor 51 detecting a rotating speed of the crankshaft and an accelerator sensor 52 detecting an accelerator position. The rotation speed sensor 51 is a pickup sensor, which outputs engine speed pulse signals (NE pulse). In the present embodiment, the NE pulse is outputted every 30° CA.

An electronic control unit (ECU) 60 includes a microcomputer having a CPU, a ROM, a RAM, and an EEPROM. The ROM stores a various control programs therein. The ECU 60 receives various detection signals from the above sensors and other sensors. The ECU 60 computes a fuel injection quantity and a fuel injection timing based on the engine driving information including an engine speed, an accelerator position and the like. Then, the ECU 60 outputs an injection control signal to the fuel injector 17.

The ECU 60 controls the fuel pressure in the common-rail 42 according to the current engine driving condition. Specifically, the ECU 60 computes a target fuel pressure in the common-rail 42 based on the engine speed and the accelerator position and adjusts the discharge quantity of the fuel pump 43 so that the actual fuel pressure detected by the pressure sensor 44 agrees with the target fuel pressure. That is, the ECU 60 executes a fuel pressure feedback control.

Figure 2A:
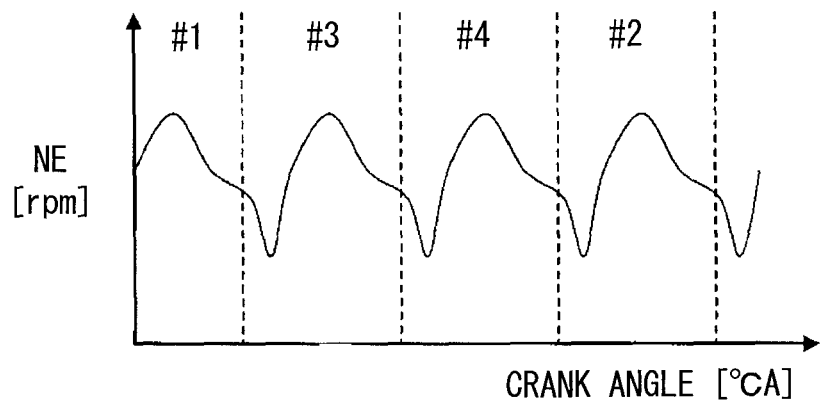
FIGS. 2A and 2B are waveform charts respectively showing an engine speed NE and a variation in engine speed ΔNE.

It should be noted that the engine speed NE varies according to a combustion in each cylinder. An increase and a decrease in engine speed NE are repeated according to each stroke in a combustion cycle. As shown in FIG. 2A, an order of power stroke in four cylinders is a first cylinder (#1), a third cylinder (#3), a fourth cylinder (#4), and a second cylinder (#2) in this series. The fuel injection is performed every 180° CA of the crankshaft. In one combustion cycle of a single cylinder, the engine speed NE is increased along with a fuel combustion and then the engine speed NE is decreased due to a load applied to the crankshaft. The engine speed NE shown in FIG. 2A is computed based on a time period which is required for a crankshaft 17 to rotate a specified angle (30° CA). This engine speed NE is referred to as an instant engine speed.

According to the present embodiment, in view of a variation in engine speed NE for each cylinder, the actual torque is estimated with respect to each cylinder according to the variation in engine speed NE.

Specifically, the discrete Fourier transform is conducted with respect to the engine speed NE, whereby the variation in engine speed NE is computed. Then, based on the variation in engine speed NE, the actual torque of each cylinder is computed. In this case, according to the following formula (1), the discrete Fourier transform is conducted with respect to the actual engine speed NE (NE waveform), whereby a real part Re and an imaginary part Im of the Fourier series Crow are computed.

$$C_{row\_}\text{Re} = C_{row\_}\text{Re} + \frac{\Delta}{CNT0} \cdot NE \cdot \cos\left(2\pi \frac{\frac{CNT}{CNT0}}{\frac{T}{\Delta}}\right) \quad (1)$$

$$C_{row\_}\text{Im} = C_{row\_}\text{Im} + \frac{\Delta}{CNT0} \cdot NE \cdot \sin\left(2\pi \frac{\frac{CNT}{CNT0}}{\frac{T}{\Delta}}\right)$$

In the above formula (1), "CNT" represents the number of angle counter which is counted up in a computing cycle of NE (30° CA cycle). "CNT0" represents the number of counter which corresponds to a combustion cycle (180° CA) of the engine 10. "T" represents the combustion cycle (180° CA cycle). "Δ" represents the computing cycle of NE (30° CA cycle). It should be noted that Crow_Re and Crow_Im are successively updated in one rotation cycle of the crankshaft.

Moreover, the computed Crow_Re and Crow_Im are substituted into a formula (2), whereby an amplitude Arow and a phase-angle θrow of a component waveform of the combustion cycle "T" are computed.

$$A_{row} = \sqrt{(C_{row\_}\text{Re})^2 + (C_{row\_}\text{Im})^2} \quad (2)$$

$$\theta_{row} =$$

$$\begin{cases} \text{If } C_{row\_}\text{Re} \geq 0, C_{row\_}\text{Im} \geq 0 & \text{then } \arctan\left(\frac{C_{row\_}\text{Im}}{C_{row\_}\text{Re}}\right)\frac{180}{\pi} \\ \text{elseif } C_{row\_}\text{Re} < 0, C_{row\_}\text{Im} < 0, & \text{then } \arctan\left(\frac{C_{row\_}\text{Im}}{C_{row\_}\text{Re}}\right)\frac{180}{\pi} - 180 \\ \text{else } \arctan\left(\frac{C_{row\_}\text{Im}}{C_{row\_}\text{Re}}\right)\frac{180}{\pi} + 180 \end{cases}$$

Figure 2B:
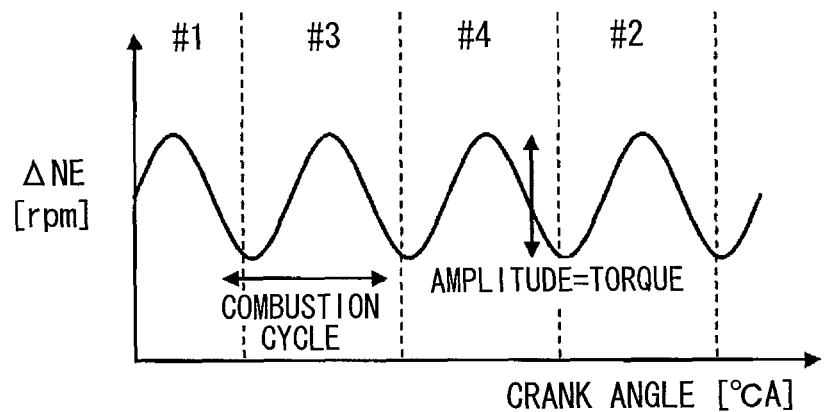

FIG. 2B shows a waveform of variation in engine speed NE (ΔNE) which is obtained by conducting the discrete Fourier transform with respect to the engine speed NE (NE waveform). An amplitude (difference between a peak value and a bottom value) of the NE variation (ΔNE) corresponds to the amplitude Arow which is computed according to the above formula (2). Also, the amplitude Arow is equivalent to the actual torque in each cylinder.

According to the present embodiment, it is determined whether an abnormality occurs in the control system based on the computed actual torque (amplitude Arow). Specifically, the torque component of the combustion cycle can be classified into a combustion component (combustion torque) generated due to a fuel combustion and a non-combustion component (non-combustion torque). The non-combustion torque includes an inertia torque of the engine 10 and a compression torque generated by a compression of air in the combustion chamber 16. If it is assumed that the fuel injector 17 injects no fuel while the engine 10 is running, only non-combustion torque is generated. The non-combustion torque can be previously computed as a reference value. By comparing the actual torque and the non-combustion torque, a deviation amount therebetween can be obtained. Based on the obtained deviation amount, an abnormality diagnosis can be conducted. For example, when the actual torque is increasing even though no fuel is injected, an increase in the actual torque can be detected by the above comparison, so that it can be determined that an abnormality occurs in the control system.

However, causes of the abnormality can not be identified.

According to the present embodiment, the abnormality diagnosis is conducted based on a variation in the fuel pressure under a specified condition where it is assumed that the fuel pressure in the common-rail 42 is held constant (no fuel is introduced into or discharged from the common-rail 42) in addition to the variation in the actual torque with no fuel injection. Thus, even if the actual torque is increased or decreased relative to the reference value with no fuel injection in each case, it can be diagnosed what type of abnormality occurs in each case based on a variation mode in fuel pressure in the common-rail 42.

Abnormalities which can be identified are following abnormalities #1-#6.

Abnormality #1: Engine oil flows into a combustion chamber.

Abnormality #2: Engine oil flows into an intake passage.

Abnormality #3: The fuel injector 17 does not inject fuel correctly.

Abnormality #4: The fuel leakage occurs in a high-pressure passage.

Abnormality #5: The fuel pump 43 does not discharge the fuel correctly.

Abnormality #6: The engine 10 has an abnormality in its friction.

Specifically, in the above abnormality #1, the engine oil flows into the combustion chamber 16 through a clearance between the cylinder and the piston in the cylinder block 11. In the abnormality #2, the engine oil is mixed with the intake air due to a malfunction of the turbocharger 30 and the engine oil flows into the combustion chamber 16. In the abnormality #3, the fuel injector 17 unintentionally injects the fuel due to a malfunction of the fuel injector 17 or the ECU 60. In the abnormality #4, high-pressure fuel leaks outside due to a malfunction of the high-pressure fuel pipe 41, the common-rail 42 or the pressure-reducing valve 45. In the abnormality #5, the fuel pump 43 unintentionally discharges the fuel due to a malfunction of the fuel 43. In the abnormality #6, the friction is abnormally increased in the engine 10 due to a shortage of engine oil or its viscosity decrease.

Figure 3A:
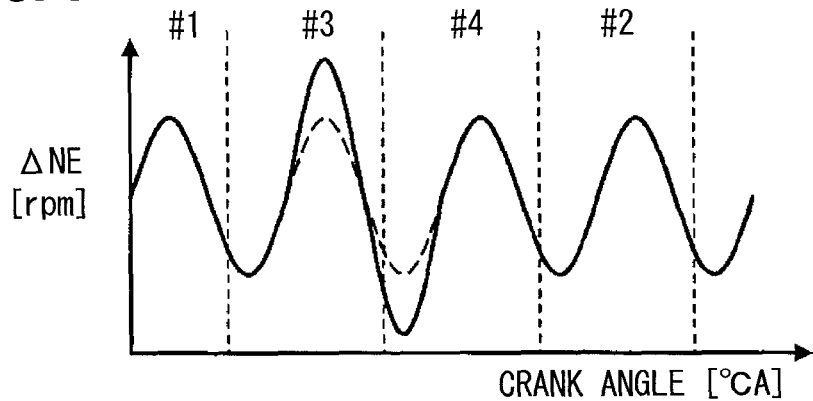
FIGS. 3A to 3C are waveform charts respectively showing a variation in engine speed ΔNE in a case that a abnormality occurs.
Figure 3B:
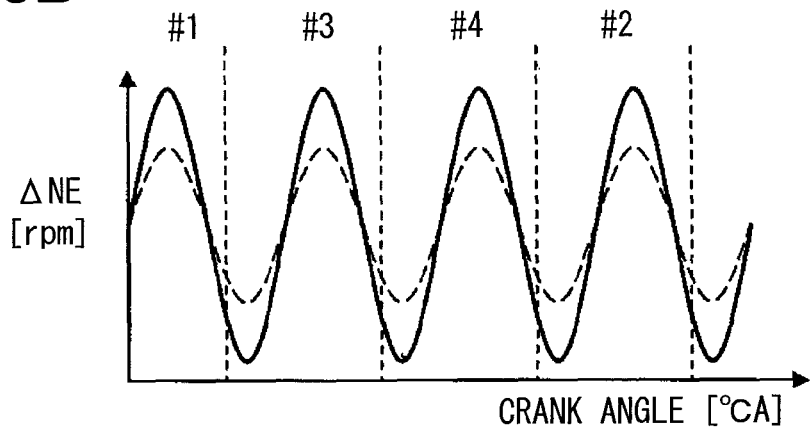
Figure 3C:
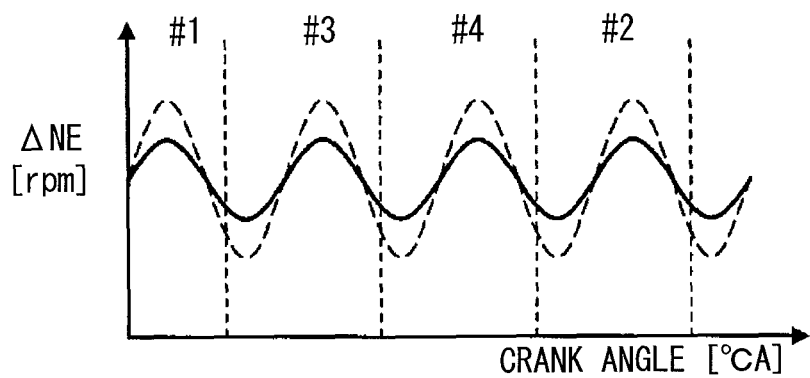
Figure 4A:
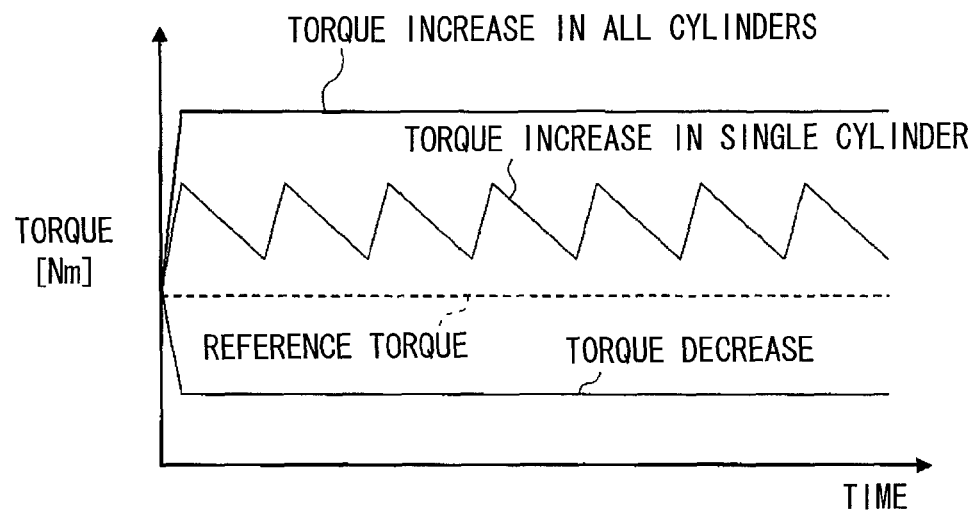
FIGS. 4A and 4B are time charts respectively showing an engine torque and a fuel pressure in cases of a normal control system and an abnormal control system.
Figure 4B:
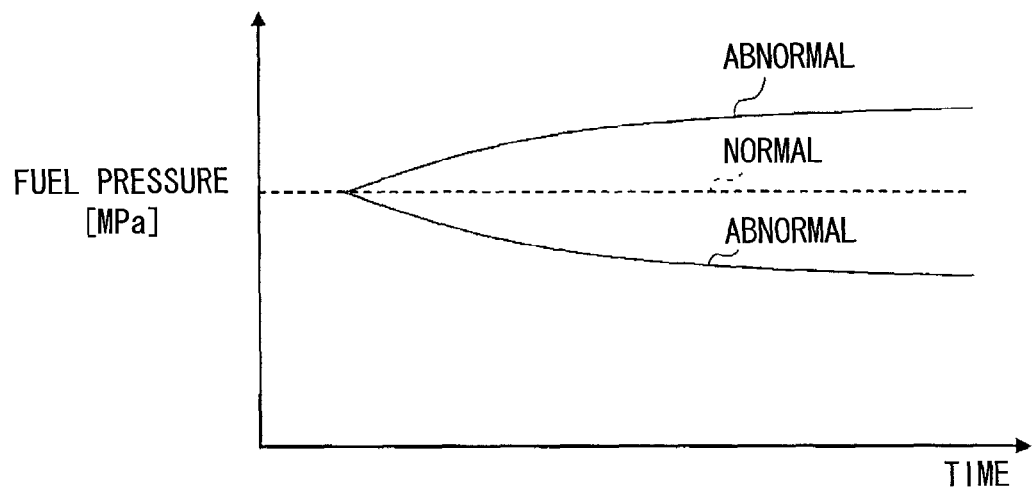

Referring to FIGS. 3A to 3C, 4A and 4B, the variations in the actual torque and the fuel pressure will be described with respect to each abnormality #1 to #6. FIGS. 3A to 3C show the variation in the engine speed NE relative to a reference value. A solid line represents an actual NE variation ($\Delta$NE) and a dashed line represents a reference NE variation ($\Delta$NE). FIG. 4A shows a variation in torque. A dashed line represents a reference torque and three solid lines represent actual torques with abnormality. FIG. 4B shows a variation in fuel pressure. A dashed line represents the fuel pressure with no abnormality and solid lines represent the fuel pressure with abnormality.

In the above abnormalities #1 to #3, the actual torque is increased with respect to the reference value. That is, in the abnormalities #1 and #2, a torque increase occurs due to the engine oil combustion. In the abnormality #3, a torque increase occurs to the fuel combustion. It should be noted that the torque increase occurs in a part of cylinders in the above abnormality #1 and the torque increase simultaneously occurs in all cylinders in the abnormality #2. That is, when the above abnormality #1 occurs, an amplitude (actual torque) of the actual NE increases relative to a reference amplitude (reference torque) in a part of cylinders (#3), as shown in FIG. 3A. When the above abnormality #2 occurs, as shown in FIG. 3B, the amplitude (actual torque) of the actual NE increases relative to the reference amplitude (reference torque) in all cylinders (#1 to #4). Also, there is a difference in the torque variation between the above abnormality #1 and the above abnormality #2, as shown in FIG. 4A. While the fuel pressure in the common-rail 42 is kept constant in the above abnormalities #1 and #2, the fuel pressure in the common-rail 42 is decreased in the above abnormality #3, as shown in FIG. 4B. According to the above, each of the abnormalities #1 to #3 can be identified.

In the above abnormalities #4 and #5, although there is no variation in the actual torque of the engine 10, the fuel pressure in the common-rail 42 is decreased in the abnormality #4 and the fuel pressure in the common-rail 42 is increased in the abnormality #5, as shown in FIG. 4B. Therefore, each of the abnormalities #4 and #5 can be identified.

In the above abnormalities #3 and #4, although the fuel pressure in the common-rail 42 is decreased, the actual torque of the engine 10 is increased in the abnormality #3 and the actual torque of the engine 10 is not increased in the abnormality #4, as shown in FIG. 4A. Therefore, each of the abnormalities #3 and #4 can be identified. When the abnormality #3 occurs, it is likely that the torque increase mode depends on whether the abnormality occurs in a part of the cylinders or in all cylinders.

When the abnormality #6 occurs, the fuel pressure in the common-rail 42 is kept constant and the actual torque of the engine 10 is decreased relative to the reference value, as shown in FIG. 4A. Thereby, the above abnormality #6 can be identified.

Figure 5:
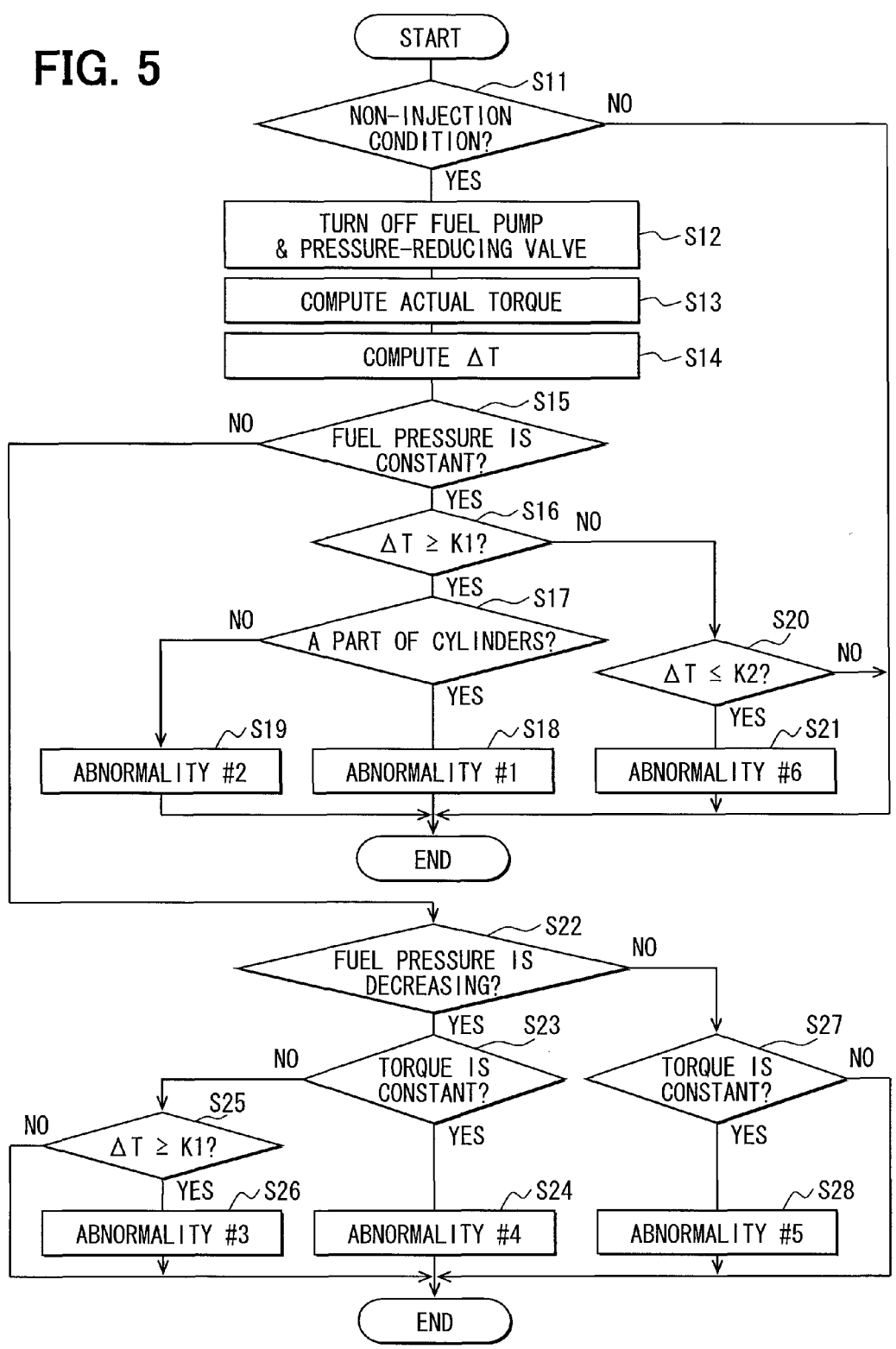
FIG. 5 is a flowchart showing an abnormality diagnosis processing.

FIG. 5 is a flowchart showing an abnormality diagnosis processing. The ECU 60 repeatedly executes the processing at specified intervals.

In step S11, the computer determines whether the engine 10 is in a non-injection condition. In the present embodiment, when an accelerator pedal is not stepped and the engine speed NE is not less than a specified fuel-cut speed, a fuel-cut is conducted. When the fuel-cut is conducted, it is determined that the engine 10 is in the non-injection condition. When the answer is YES, the procedure proceeds to step S12. When the answer is NO, the procedure ends.

In step S12, operations of the fuel pump 43 and the pressure-reducing valve 45 are stopped. Since the fuel pump 43 and the pressure-reducing valve 45 are off in the non-injection condition, no fuel flows into the common-rail 42 and no fuel flows out from the common-rail 42. Thus, the fuel pressure in the common-rail 42 is kept constant.

In step S13, the computer computes an actual torque for each cylinder at the combustion cycle. In this case, the amplitude Arow is computed as the actual torque for every cylinder, according to the formulas (1) and (2).

Then, in step S14, the computer computes a torque deviation $\Delta$T between the actual torque computed in step S14 and a predetermined reference torque (Torque deviation $\Delta$T=Actual torque–Reference torque). The reference torque is defined as an ideal value of the instant torque at the combustion cycle in a condition where no fuel is injected into the engine 10. The reference torque is previously stored in the memory of the ECU 60.

Then, in step S15, the computer determines whether the actual fuel pressure has been held constant after the fuel pressure becomes constant. When the answer is YES in step S15, the procedure proceeds to step S16. When the answer is NO in step S15, the procedure proceeds to step S22.

In step S16, the computer determines whether the torque deviation $\Delta$T is greater than or equal to a specified threshold "K1" (K1>0). When the answer is YES, the procedure proceeds to step S17 in which the computer determines whether the increase in the actual torque occurs in a part of cylinders or in all cylinders.

When the increase in the actual torque occurs in a part of cylinders, the procedure proceeds to step S18. The computer determines that the abnormality #1 occurs in which the engine oil flows into the combustion chamber. At this moment, the computer detects a cylinder in which the torque increase occurs, whereby the cylinder having an abnormality can be identified. Meanwhile, the increase in the actual torque occurs in all cylinders, the procedure proceeds to step S19. The computer determines that the abnormality #2 occurs in which the engine oil flows into the intake passage.

When the answer is NO in step S16, the procedure proceeds to step S20 in which the computer determines whether the torque deviation ΔT is less than or equal to a specified threshold K2 (K2<0). When the answer is YES, the procedure proceeds to step S21. The computer determines that the abnormality #6 occurs in which the engine 10 has an abnormality in its friction.

When the answer is NO in step S15, that is, when a variation in the fuel pressure occurs, the procedure proceeds to step S22 in which the computer determines whether the fuel pressure is decreasing. When the answer is YES in step S22, the procedure proceeds to step S23 in which the computer determines whether the actual torque has been constant relative to the reference torque. When the answer is YES in step S23, the procedure proceeds to step S24. The computer determines that the abnormality #4 occurs, in which the fuel leakage occurs in a high-pressure passage. When the answer is NO in step S23, the procedure proceeds to step S25 in which the computer determines whether the torque deviation ΔT is greater than or equal to the specified threshold K1. When the answer is YES, the procedure proceeds to step S26. The computer determines that the abnormality #3 occurs, in which the fuel injector 17 does not inject fuel correctly.

When the answer is NO in step S22, that is, when the fuel pressure is increasing, the procedure proceeds to step S27 in which the computer determines whether the actual torque has been constant relative to the reference torque. When the answer is YES in step S27, the procedure proceeds to step S28. The computer determines that the abnormality #5 occurs, in which the fuel pump 43 does not discharge the fuel correctly.

In each of steps S18, S19, S21, S24, S26 and S28, the diagnosis result is stored in a backup memory (for example, EEPROM) of the ECU 60, as diagnosis data. Thereby, based on the diagnosis data, a cause of abnormality can be identified and a maintenance can be properly conducted according to the abnormality. If some parts should be replaced by new parts, the number of the parts can be reduced as less as possible. Moreover, fail-safe processings can be properly conducted according to the cause of abnormality.

When the answer is YES in step S15 and the answers are NO in steps S16 and S20, the computer determines that the control system has no abnormality.

According to the present embodiment, following advantages can be obtained.

While the engine is running, the fuel injector 17 injects no fuel, and the fuel pump 23 discharges no fuel so that the fuel pressure in the common-rail 42 is kept constant, the actual torque is computed based on the current engine speed NE (instant engine speed) and the computer determines whether the actual torque is increased or decreased by the specified amount or more relative to the reference torque. Further, the computer detects the variation in fuel pressure in the common-rail 42 and determines whether an abnormality occurs and which type of abnormality occurs based on the variation in the fuel pressure in the common-rail 42. Thus, even if the actual torque is increased or decreased relative to the reference torque with no fuel injection in each case, it can be diagnosed what type of abnormality occurs in each case based on a variation mode in fuel pressure in the common-rail 42. Consequently, the type of abnormality can be identified and suitable maintenances can conducted in the control system.

Each of the above abnormalities #1 to #6 can be respectively identified by using of the common abnormality diagnosis parameters. The abnormality diagnosis can be conducted effectively.

OTHER EMBODIMENT

The present invention is not limited to the embodiments described above, but may be performed, for example, in the following manner.

In the above embodiment, the discrete Fourier transform is conducted with respect to the engine speed NE, whereby the variation in engine speed NE is computed. Then, based on the variation in engine speed NE, the actual torque of each cylinder is computed. That is, a variation component of the engine speed NE is extracted as an instant torque NEflt by means of a band-pass filter (BPF). The engine speed NE computed based on the detection signal (NE pulse) of the engine speed sensor 51 includes noises and detection errors. The detection value of the engine speed NE disperses relative to an actual engine speed. The BPF removes high-frequency components and low-frequency components, whereby the instant torque NEflt has no dispersion. The detection period of the NE pulse is 6° CA. This instant torque NEflt(i) is expressed by a following formulas (3).

$$NEflt(i)=k1*NE(i)+K2*NE(i-1)+K3*NE(i-2)+k4*NEflt(i-1)+k5*NEflt(i-2) \quad (3)$$

In this formula (3), NE(i) is a current sampling value of the engine speed, and NE(i−1) and NE(i−2) represent previous sampling values. NEflt(i−1) and NEflt(i−2) represent previous instant torques. "k1" to "k5" are constants.

The above formula (3) is obtained by discretizing a transfer function G(s) expressed by a following formula (4).

$$G(s) = \frac{2\zeta\omega s}{s^2 + 2\zeta\omega s + \omega^2} \quad (4)$$

wherein ζ represents an attenuation coefficient and ω represents a response frequency.

The response frequency ω is defined as a combustion frequency of the engine 10. Based on this, the constants "k1"-"k5" are also defined. The combustion frequency is an angular frequency which represents a number of combustion per a unit angle. In a case of a four-cylinder engine, the combustion cycle is 180° CA and its inverse number is defined as the combustion frequency.

The instant torque NEflt of each cylinder is integrated during a specified period from a top dead center (TDC). Based on the integrated instant torque, cylinder torque NEtrq is computed with respect to each cylinder. The integrating specified range is defined from TDC to ATDC 90° CA. Alternatively, the integrating specified range is defined from TDC to ATDC 180° CA. The integrating specified range may be defined with respect to each cylinder. The computing process of the cylinder torque NEtrq is conducted in step S13.

Even in a configuration where the cylinder torque NEtrq is computed, the computer can determine whether an abnormality occurs and what type of abnormality occurs based on the variations in torque and fuel pressure under the condition in which the fuel injector 17 injects no fuel and the fuel pump 23 discharges no fuel so that the fuel pressure in the common-rail 42 is kept constant while the engine is running.

In the above embodiment, the reference torque is previously computed. However, the actual torque in a normal condition can be set as the reference torque when the vehicle is shipped. Also in this case, when the actual torque is increased or decreased relative to the reference torque, the computer can determine that an abnormality occurs.

Although the diagnosis is conducted with respect to six abnormalities in the above embodiment, the diagnosis may be conducted with respect to a part of the abnormalities.

What is claimed is:

1. An abnormality diagnosis apparatus for an internal combustion engine control system which is provided with a fuel pump discharging a high-pressure fuel, an accumulator accumulating the high-pressure fuel therein, and a fuel injector injecting the high-pressure fuel accumulated in the accumulator into the internal combustion engine, the abnormality diagnosis apparatus computing an actual torque generated by the internal combustion engine at a combustion cycle based on an instant speed of the internal combustion engine, the abnormality diagnosis apparatus performing a diagnosis of the internal combustion engine control system based on the computed actual torque, the abnormality diagnosis apparatus comprising:
   a torque determining portion computing the actual torque based on the instant speed of the internal combustion engine under a specified condition where the internal combustion engine is running, the fuel injector injects no fuel and the fuel pump discharges no fuel so that the fuel pressure in the accumulator is kept constant, the torque determining portion determining whether the actual torque is increased or decreased by the specified amount or more relative to a predetermined reference torque;
   a pressure variation detecting portion detecting a variation in fuel pressure in the accumulator under the specified condition; and
   an abnormality determining portion determining whether an abnormality occurs and identifying a type of the abnormality based on a determining result of the torque determining portion and the variation in fuel pressure in the accumulator detected by the pressure variation detecting portion.

2. An abnormality diagnosis apparatus according to claim 1, wherein:
   the internal combustion engine has multiple cylinders;
   the torque determining portion computes the actual torque for each cylinder of the internal combustion engine under the specified condition;
   the abnormality determining portion determines that an abnormality occurs when the torque determining portion determines that the actual torque is increased by the specified amount or more relative to the reference torque; and
   the abnormality determining portion determines that an engine oil flows into a combustion chamber of the internal combustion engine further when an increase in actual torque is generated in a part of the cylinders.

3. An abnormality diagnosis apparatus according to claim 2, wherein:
   the abnormality determining portion determines that an abnormality occurs when the torque determining portion determines that the actual torque is increased by the specified amount or more relative to the reference torque; and
   the abnormality determining portion determines that an engine oil flows into an intake passage of the internal combustion engine further when an increase in actual torque is generated in a part of the cylinders.

4. An abnormality diagnosis apparatus according to claim 2, wherein:
   the abnormality determining portion determines that an abnormality occurs when the torque determining portion determines that the actual torque is increased by the specified amount or more relative to the reference torque; and
   the abnormality determining portion determines that the fuel injector does not inject the fuel correctly further when the fuel pressure in the accumulator is decreased.

5. An abnormality diagnosis apparatus according to claim 1, wherein:
   the abnormality determining portion determines that an abnormality occurs when the fuel pressure in the accumulator detected by the pressure variation detecting portion is decreased; and
   the abnormality determining portion determines that a fuel leakage occurs in a high-pressure passage including the accumulator further when the torque determining portion determines that the actual torque is not varied.

6. An abnormality diagnosis apparatus according to claim 1, wherein:
   the abnormality determining portion determines that an abnormality occurs when the fuel pressure in the accumulator detected by the pressure variation detecting portion is increased; and
   the abnormality determining portion determines that the fuel pump does not discharge the fuel correctly further when the torque determining portion determines that the actual torque is not varied.

7. An abnormality diagnosis apparatus according to claim 1, wherein:
   the abnormality determining portion determines that an abnormality occurs when the torque determining portion determines that the actual torque is decreased by the specified amount or more relative to the reference torque; and
   the abnormality determining portion determines that the internal combustion engine has an abnormality in its friction when the fuel pressure in the accumulator is kept constant.

* * * * *